H. T. DEALY.
PISTON HEAD FOR ENGINES.
APPLICATION FILED FEB. 20, 1917.
1,240,684.
Patented Sept. 18, 1917.
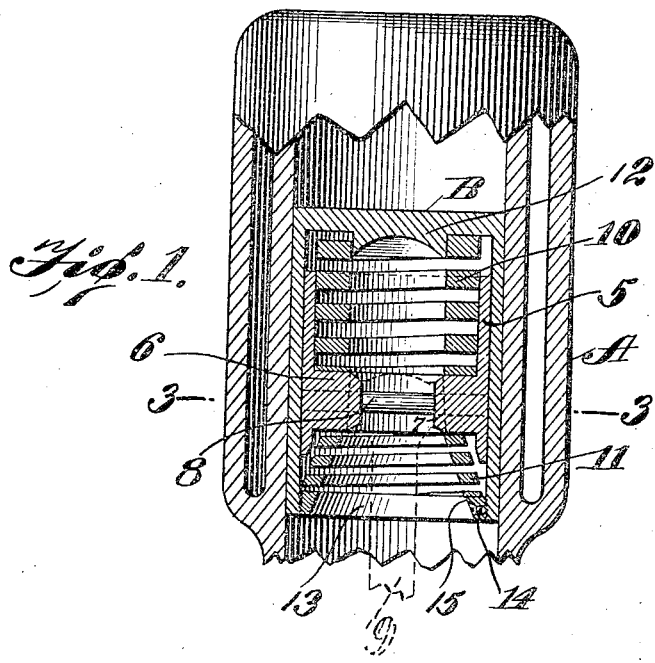
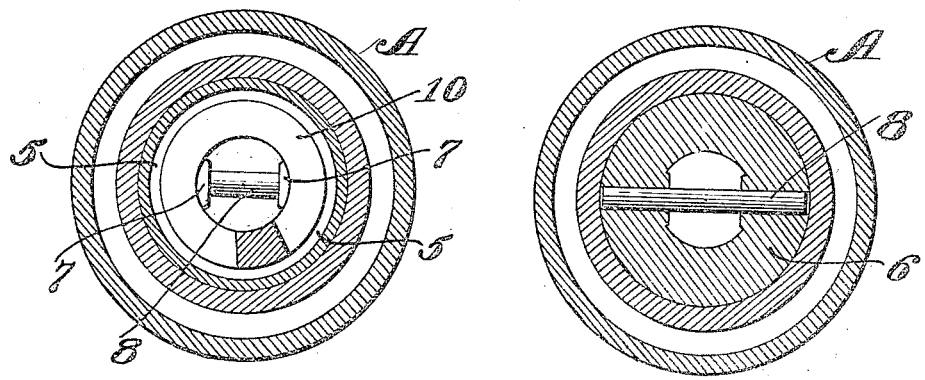
Inventor
H. T. DEALY.
By Talbert & Parker,
Attorneys

UNITED STATES PATENT OFFICE.

HUBERT T. DEALY, OF ALFALFA, OREGON.

PISTON-HEAD FOR ENGINES.

1,240,684.   Specification of Letters Patent.   Patented Sept. 18, 1917.

Application filed February 20, 1917. Serial No. 149,901.

*To all whom it may concern:*

Be it known that I, HUBERT T. DEALY, a citizen of the United States, residing at Alfalfa, in the county of Crook and State of Oregon, have invented certain useful Improvements in Piston-Heads for Engines, of which the following is a specification, reference being had therein to the accompanying drawing.

The invention relates to piston construction for stationary, marine and gasolene engines or the like, and more particularly to the class of piston heads for engines.

The primary object of the invention is the provision of a piston head of this character wherein the direct shock of combustion is relieved from the crank shaft as it is absorbed by the piston head and thus avoids strains upon the cylinder and its head and crank shaft with assurance of a perfect stroke of the piston as well as a more perfect combustion of the gases with resultant maximum power to the engine.

Another object of the invention is the provision of a piston head of this character wherein the deposit of carbon within the cylinder is minimized and the necessity of repairs lessened and also the least cleaning and attention required.

A further object of the invention is the provision of a piston head of this character wherein, instead of transmitting shock of combustion directly to the crank shaft, it is absorbed by said head and, as compression within the cylinder lowers, the power is given back and at a place in the revolution of the crank shaft where most effective, thereby reducing vibration and increasing the power of the engine.

A still further object of the invention is the provision of a piston head of this character which is novel in form to assure a more perfect working of the engine and minimize wear resultant from vibration and shock when in operation.

A still further object of the invention is the provision of a piston head of this character which is simple in construction, thoroughly reliable and efficient in its operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter set forth, and the scope of the application of which will be indicated in the appended claims.

In the accompanying drawings:

Figure 1 is a fragmentary sectional elevation of an engine showing the piston head constructed in accordance with the invention;

Fig. 2 is a fragmentary horizontal sectional view;

Fig. 3 is a sectional view on the line 3—3 of Fig. 1.

Similar reference characters indicate corresponding parts throughout the several views of the drawing.

Referring to the drawing in detail, A designates generally the cylinder of a gasolene engine which is merely shown to illustrate the construction and operation of the piston head hereinafter fully described. The cylinder of the gasolene engine is of the ordinary well known construction, and B is the piston head which is reciprocatingly movable therein, as usual, and has internally thereof the floating false piston head hereinafter fully described.

The false head comprises a cylindrical body 5, which is slidably fitted in the head B and is formed with an annular flange 6, having at diametrically opposite points bearing lugs 7 in which is journaled the connecting pin 8 for the crank arm 9 extending from the crank shaft in said engine.

The flange 6 provides seats for compression springs 10 and 11 respectively, which have limited expansion and work in opposition to each other and are located within the piston head A at opposite sides of the false head, the springs being for the purpose to be described in detail hereinafter.

The spring 10 is of convoluted formation, with the coils thereof of uniform diameter with respect to each other, one end of the spring being supported upon the seat formed by the flange 6, while the opposite end engages concentrically about a centering boss 12 depending from and integral with the closed end of the piston head B. The opposite open end of the piston head is internally threaded for the reception of an adjustable bearing ring 13 which is held in its adjusted position through the medium of a set screw 14 carried thereby, the inner surface of the ring 13 being beveled at 15 to permit the proper movement of the connecting arm 9 without interference therewith in the working of the engine.

The spring 11 is of helical conoidal formation, with the smaller end thereof resting against the seat provided by the flange 6, while the wider end of said spring engages upon the inner side of the bearing ring 13, the spring 11 being of the shape hereinbefore set forth to avoid interference with the movement of the crank arm when the engine is active. These springs 10 and 11 coact with the false piston head so as to absorb shocks and jars in the reciprocation of the piston head B within the cylinder A of the engine and thereby eliminate the direct shock of combustion to the crank shaft, and instead of said shock being directed to the shaft it is absorbed by the spring 10 and as compression within the cylinder of the engine lowers the power is given back under the action of the spring 10 and at a point in the revolution of the crank shaft where most effective, so that all vibration is eliminated and increased power of the engine attained.

It is of course understood that the piston head B can be of any desirable construction, having the usual piston rings so that in the construction of the piston head the present arrangement of the piston rings is not interfered with, so that any variance in the piston head B is optional with the manufacturer.

It is of course to be understood that changes, variations and modifications may be made such as come properly within the scope of the appended claims without departing from the spirit of the invention or sacrificing any of the advantages of the invention.

The piston head B can be made light and in the construction thereof will assure a more perfect combustion of gases with resultant maximum force or power and a lesser deposit of carbon within the engine, thereby minimizing repairs and the necessity of the frequent cleaning of the engine, is usual.

From the foregoing description, taken in connection with the accompanying drawing, the construction and manner of operation of the herein described piston will be readily apparent and, therefore, a more extended explanation has been omitted.

Having thus described my invention, I claim:

1. The combination with a piston head, of a floating false piston head slidably fitted therein and having an internal flange, resilient compression springs disposed at opposite sides of the flange and resting against the same, one of the springs being seated against the closed end of the piston head, means on the piston head for centering the spring resting against the same, and a bearing ring adjustably mounted within the piston head at the open end thereof for the other spring.

2. The combination with a piston head, of a floating false piston head slidably fitted therein and having an internal flange, resilient compression springs disposed at opposite sides of the flange and resting against the same, one of the springs being seated against the closed end of the piston head, means on the piston head for centering the spring resting against the same, a bearing ring adjustably mounted within the piston head at the open end thereof for the other spring, and a set screw carried by the bearing ring for locking it in adjusted position.

3. The combination with a piston head, of a floating false piston head slidably fitted therein and having an internal flange, resilient compression springs disposed at opposite sides of the flange and resting against the same, one of the springs being seated against the closed end of the piston head, means on the piston head for centering the spring resting against the same, a bearing ring adjustably mounted within the piston head at the open end thereof for the other spring, a set screw carried by the bearing ring for locking it in adjusted position, and diametrically opposed lugs on the flange for the pivotal connection of a crank arm therewith, one of the springs being of helical conoidal shape, while the other spring is formed with uniform coils with respect to each other.

In testimony whereof I affix my signature.

HUBERT T. DEALY.